Aug. 31, 1965  S. PETROW  3,203,223
BRIDGE-TYPE TRANSDUCER WITH ABSOLUTE CALIBRATION OUTPUTS
Filed May 20, 1963  4 Sheets-Sheet 4

INVENTOR.
SERGE PETROW
BY
Lippincott, Ralls & Hendricson
ATTORNEYS

United States Patent Office 3,203,223
Patented Aug. 31, 1965

1

3,203,223
BRIDGE-TYPE TRANSDUCER WITH ABSOLUTE
CALIBRATION OUTPUTS
Serge Petrow, Monterey Park, Calif., assignor to Fairchild Camera and Instrument Corporation, Syosset, N.Y., a corporation of Delaware
Filed May 20, 1963, Ser. No. 281,700
18 Claims. (Cl. 73—1)

This invention relates to the calibration of bridge-type transducers as employed to measure strains and the like, and is particularly directed to the provision of absolute calibration outputs which are independent of all stimuli applied to the transducer.

In bridge-type strain gauges and transducers for other purposes, it is common practice to provide for the selective generation of precalibrated outputs, generally called shunt outputs, which stimulate forces which the transducer is built to transmit and which thereby serve as calibrated reference points to the readout equipment employed to indicate the bridge output. Generally, calibrated outputs are derived from a bridge by the selective connection of resistors, having predetermined resistance values, in shunt with one or more arms of the bridge. The shunt resistors are appropriately selected in value relative to the resistance of the bridge sensor elements, such that the shunt outputs are primarily determined by the shunt resistors. The component in the shunt output which arises from some external force applied to the sensor elements is accordingly of relatively low order, and for many applications can be considered negligible. It should be noted, however, that the shunt output provided in the foregoing manner is not absolute, in that some error, no matter how small, is contained therein if the transducer is simultaneously sensing some external force. Under these conditions the shunt output may vary to some extent and loses its zero reference and accuracy because the obtained output is the sum of the shunt and force outputs. Also, the shunt output is affected by a certain error proportional to the force applied to the transducer due to the change in resistance of the active sensor elements. Accordingly, where extreme precision of calibration is required, it is necessary that the shunt output be absolute, viz., independent of any mechanical force applied to the sensor elements, so as to provide a zero reference and accuracy of calibration. Of course, an absolute calibration output may be provided by removing the stimuli applied to the transducer sensor elements at times a shunt output is to be read and registered. This is, however, cumbersome and in many applications unfeasible.

Accordingly, it is an object of the present invention to provide for the generation of absolute calibration outputs in a bridge-type transducer which can be read and registered at any time, whether or not the transducer is simultaneously sensing some external force.

Another object of the invention is the provision of absolute calibration output means in a bridge-type transducer, which is arranged to separate, or isolate, the calibration output from all stimuli applied to the transducer, to thereby provide a true precalibrated absolute output which is independent of any external mechanical force.

It is still another object of the invention to provide an absolute calibration output circuit, of the class described, which may be selectively actuated in response to the short-circuiting of a pair of the circuit conductors.

It is yet another object of the invention to provide a bridge-type transducer, with an absolute calibration output circuit of the class described, with which calibration resistors of predetermined values may be employed external to the transducer to generate absolute calibration outputs.

It is a further object of the invention to provide absolute

2 calibration output means featuring a simple electronic switch arrangement, which is operable in its normal state to transmit bridge output signal to the readout means and which is operable in a selectively triggered state to isolate bridge output signals from the readout means and, at the same time to couple a calibration resistance having a predetermined voltage drop thereacross to the readout means.

Additional objects and advantages of the invention will become apparent upon consideration of the following description in conjunction with the accompanying drawings, wherein.

Figure 1:
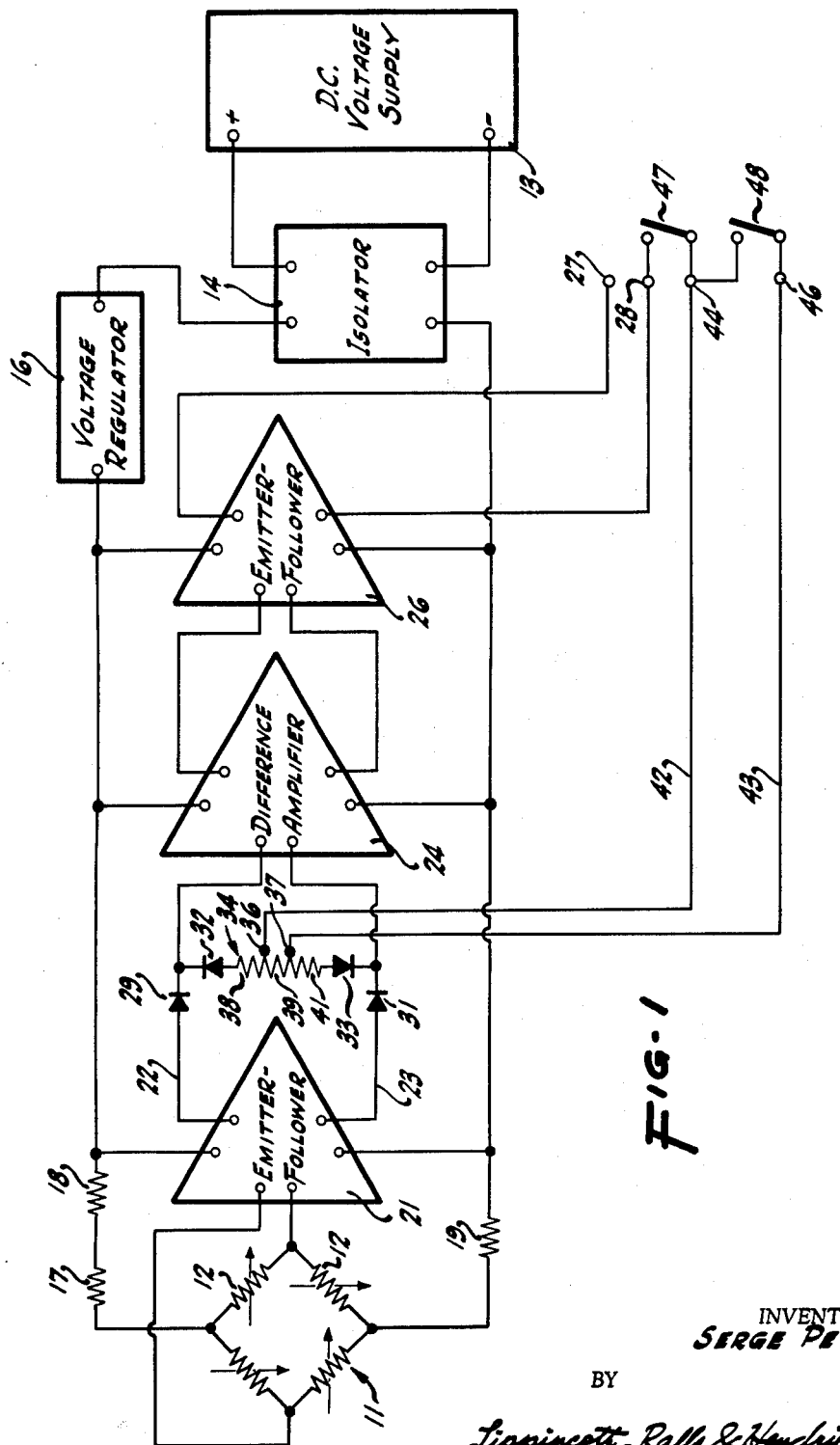
FIGURE 1 is a schematic circuit diagram of a complete high output, bridge-type transducer with absolute calibration output means incorporated therein, in accordance with the present invention.

Considering now the present invention in some detail and referring to the illustrated forms thereof in the drawings, there will be seen to be provided means for providing absolute calibration outputs in a bridge-type transducer, such calibration outputs being entirely separated from all stimuli applied to the sensing elements of the transducer. Basically the invention includes first switch means in the output circuit of the bridge having a normal condition or state wherein output signals from the bridge are transmitted to readout terminals of the transducer, and an actuated condition or state wherein the ouput signals are isolated from the readout terminals. Second switch means are preferably additionally coupled to the output side of the first switch means and arranged to couple a calibrating resistance to the readout terminals. The second switch means has a normal condition or state wherein the calibrating resistance is decoupled from the readout terminals, and an actuated condition or state wherein the calibrating resistance is coupled thereto. Actuating means are provide to selectively switch the first and second switch means between their normal and actuated states, whereby, upon actuation of the switch means, the bridge output signals are isolated from the readout terminals while the calibrating resistance is coupled thereto. In addition, means are provided to establish a voltage drop across the calibrating resistance simultaneously with actuation of the switch means. Accordingly, when the switch means are actuated an absolute calibration output signal is transmitted to the readout terminals, which is determined by the value of the calibrating resistance and which is independent of any output signals from the bridge. Preferably, the switch means are provided as diodes or equivalent electronic switch devices which are so arranged and interconnected that the output signals from the bridge forwardly bias the portion of the diode switch circuit which couples the bridge output to the readout terminals (first switch means), to thereby normally establish current flow therethrough and, hence, transmit the output signals to the readout terminals. The portion of the diode switch circuit which serves to couple the calibration resistance to the readout terminals (second switch means), and which is connected to the output side of the first portion of the switch circuit, is biased in the reverse direction by the output signals from the bridge and is, accordingly, normally nonconducting to thereby decouple the calibration resistance from the readout terminals. In this diode switching arrangement, the actuating means is then advantageously provided as means for selectively applying a voltage to the calibration resistance of a sufficient magnitude to forwardly bias the second portion of the switch circuit to a higher level than the maximum possible output signal from the bridge. As a result, this selectively established forward bias in the second portion of the switch circuit overcomes the reverse bias at the output side of the first portion of the switch circuit and effects conduction through the second portion of the circuit. At this time, the forward bias in the second portion of the circuit also appears at the output side of the first portion of the circuit and, being of greater magnitude than the maximum possible output signal from the bridge, biases the first portion of the circuit in the reverse direction to terminate conduction therein and, hence, isolate the bridge output from the readout terminals. Moreover, where the voltage is applied to the calibration resistance in such a manner as to create a voltage unbalance between its opposite ends, this unbalance is coupled to the readout terminals as an absolute calibration output signal. Thus, where actuation of the switching means is affected in the foregoing manner, the actuating means additionally functions as the means for establishing a potential drop across the calibrating resistance. The required voltage for actuating the switching means may be derived from various points in the transducer circuit which operate at significantly greater levels than the maximum output of the bridge. In a high output transducer circuit the actuating voltage may be derived by short-circuiting the calibration resistance to a suitable one of the readout terminals, these terminals commonly operating at a much higher potential level than the maximum output of the bridge. Alternatively, the actuating voltage may be derived from an appropriate one of the terminals of the voltage supply provided to excite the bridge, or from various other points of the circuit which operate at relatively high voltage.

The invention will be better understood upon consideration of several preferred embodiments thereof; and, in this regard, reference is now made to FIGURE 1 wherein one form of the absolute calibration output means of the invention is embodied in a complete high output, bridge-type transducer circuit. This circuit includes a Wheatstone bridge 11 formed of strain-sensitive sensor elements 12, or the like, and having direct current excitation voltage applied across one diagonal thereof. Preferably, bridge excitation is provided by a direct current power supply 13 connected to an isolator 14 to provide at its output an excitation voltage which is isolated from the power supply terminals. One output terminal of the isolator 14 is coupled through a voltage regulator 16 and resistors 17 and 18 to one side of the bridge diagonal. Resistors 17 and 18, respectively, provide for sensitivity adjustment and temperature compensation of the bridge. The other output terminal of the isolator is connected by means of a resistor 19, for purposes subsequently described, to the opposite end of the bridge diagonal. The opposite ends of the second bridge diagonal, which comprise the output terminals of the bridge, are coupled to the input of an emitter-follower amplifier 21, or equivalent means for providing a low impedance output from the bridge. Biasing of the emitter-follower is facilitated by connection of terminals thereof to the excitation circuit paths from the isolator 14 and voltage regulator 16. Output conductors 22 and 23 of the emitter-follower are, in turn, coupled to the input of a differential amplifier 24 which has bias terminals connected to the excitation circuit paths. In this regard, the resistor 19 previously mentioned sets the operating voltage of the differential amplifier. Output terminals of the differential amplifier are connected to a second emitter-follower amplifier 26 which, as in the instance of the emitter-follower amplifier 21, has bias terminals connected to the excitation circuit paths from isolator 14 and voltage regulator 16. The output of emitter-follower 26 is connected to negative and positive readout terminals 27 and 28.

To the extent described to this point, the transducer circuit is conventional and the circuit elements thereof operate in a well-known manner. For purposes of the present disclosure, it suffices to note that output signals are produced across the second bridge diagonal which are proportional to mechanical forces applied to the sensor elements 12, and these output signals are applied with impedance matching through the emitter-follower 21 to the input of the differential amplifier 24. By virtue of the biasing arrangement of the differential amplifier, with no signal applied to the input thereof, a relatively high voltage base, or reference signal, is coupled from the output of such amplifier through the emitter-follower 26, with somewhat less than unity gain, to the readout terminals 27 and 28. The resulting base or operating point voltage at the readout terminals is substantially greater than the maximum possible output signal which can occur at the output terminals of the bridge 11. Of course, when an input signal is applied to the differential amplifier 24 arising from an output signal from the bridge 11, the output signal at readout terminals 27 and 28 is proportionately varied from the base voltage thereat.

Considering now, in particular detail, the calibrated output means of the present invention which facilitates separation of output signals from the bridge 11 from a calibration signal selectively provided at the readout terminals 27 and 28, it is to be noted that the selective switching means outlined hereinbefore for the accomplishment of this purpose are, in the present embodiment, provided in the circuit which couples the output of the emitter-follower 21 to the input of the differential amplifier 24. More particularly, the switching means include a first pair of diodes 29 and 31 which are respectively provided with their positive terminals connected to the output terminals of emitter-follower 21 and their negative terminals respectively connected to the input terminals of differential amplifier 24. With this arrangement, any voltage existing at the output terminals of the emitter-follower 21 which arise from strain-sensitive output signals from the bridge 11 are sufficiently high to overcome the forward breakdown voltage in the diodes 29 and 31, thus permitting a free current flow therethrough to the input of the differential amplifier 24. Thus, strain-proportional signals at the output of the emitter-follow 21 are transmitted without attenuation through the diodes 29 and 31 to the differential amplifier 24. The amplified signals from this amplifier are transmitted through the emitter-follower 26 to the readout terminals 27 and 28. A meter, or equivalent readout device (not shown), may then be coupled to the terminals 27 and 28 to record the strain-responsive signals from the bridge 11 in the conventional manner. However, the absolute calibration output means of the invention further includes a second pair of diodes 32 and 33 which respectively have their negative terminals connected to the negative terminals of diodes 29 and 31. In addition, a calibration resistance 34 is connected between the positive terminals of diodes 32 and 33. Preferably, the calibration resistance is provided with a pair of taps 36 and 37 which divide the calibration resistance into resistance portions 38, 39 and 41. These taps are respectively connected as by means of conductors 42 and 43 to short-circuiting terminals 44 and 46 which may be selectively short-circuited to the positive readout terminal 28. In this regard, a switch 47 is preferably connected between readout terminal 28 and terminal 44, while a switch 48 is connected between terminals 44 and 46.

In order to provide an absolute calibration output signal at the readout terminals 27 and 28, switch 47, for example, is closed to thereby short-circuit the conductor 42 to the positive readout terminal 28. The relatively high voltage at the positive readout terminal 28, as thus applied to the calibration resistance 34, provides voltages at the positive terminals of diodes 32 and 33 which are substantially more positive than the voltages existing at the negative terminals of these diodes due to output signals from the emitter-follower 21. Accordingly, the diodes 32 and 33 are rendered conducting and relatively high positive potentials are applied to the negative terminals of diodes 29 and 31 to terminate the conduction thereof. Diodes 29 and 31 now isolate the output of the emitter-follower 21 from the input of the differential amplifier 24 and, therefore, no strain-sensitive signals from the bridge 11 are coupled thereto. Moreover, the negative terminal of diode 32 is positively unbalanced with respect to the negative terminal of diode 33 because of the ratio existing between resistance portion 38, and resistance portion 39 plus resistance portion 41. This voltage unbalance is applied to the input terminals of the differential amplifier 24, amplified therein, and coupled by the emitter-follower 26 to the readout terminals 27 and 28 as an absolute calibration output, which may be registered by a readout device coupled to the terminals. It is particularly important to note that the absolute calibration output, as thus provided at the readout terminals 27 and 28, is entirely independent of any stimuli applied to the bridge 11 by virtue of the isolating action provided by the diodes 29 and 31. More particularly, the absolute calibration output is only determined by the ratio of resistances between the portions of the calibration resistance on opposite sides of the tap 36 and by the normal base or reference voltage existing at the positive readout terminal 28. The absolute calibration output signal thus provides a zero reference and extreme accuracy of calibration, since it is unaffected by error arising from the simultaneous sensing of an external force by the bridge 11. A second absolute calibration or shunt output is obtained with the circuit of FIGURE 1 upon the simultaneous closing of switches 47 and 48, both conductors 42 and 43 being at this time short-circuited to the positive readout terminal 28 and thereby short-circuiting resistance portion 39 of the calibrating resistance 34. Under these circumstances, diodes 29 and 31 are again rendered nonconducting, such that they isolate the output of the emitter-follower 21 from the input of the differential amplifier 24. Diodes 32 and 33 are again rendered conducting and, with the ratio of portions 38 and 41 of the calibrating resistance 34, selected to provide an unbalance; this unbalance is again amplified by the differential amplifier 24 and coupled therefrom by the emitter-follower 26 to the readout terminals 27 and 28 as an absolute calibration output. This output is, of course, different from that existing where only switch 47 is closed, by virtue of the change in the ratio of the resistances of the portions of the calibrating resistance 34 effected by the shorting of resistance portion 39 in response to closure of switch 48.

Figure 2:
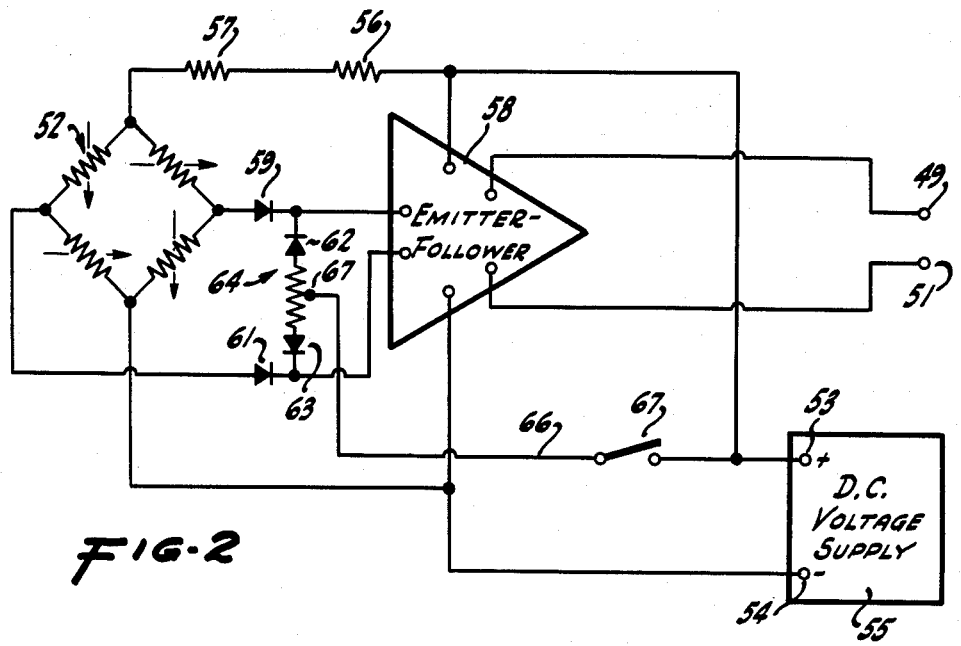
FIGURE 2 is a schematic circuit diagram of absolute calibration output means, in accordance with the present invention, as incorporated in a bridge-type transducer having a relatively low output.

The absolute calibration output means of the present invention may be variously applied in alternative circuit arrangements to that described above with reference to the complete bridge circuit of FIGURE 1. For example, the absolute calibration means may be employed in a somewhat modified form to provide absolute calibration outputs in a low output bridge-type transducer, as depicted in FIGURE 2. In such a low output circuit, the signals appearing at the readout terminals 49 and 51 are substantially equal to, and in fact somewhat less than, the output signals generated by the bridge 52. More particularly, in this circuit positive and negative terminals 53 and 54 of a direct current voltage supply 55 are respectively coupled through a temperature compensating resistor 56 and sensitivity adjusting resistor 57 to one excitation terminal, and directly connected to the other excitation terminal at the opposite ends of one diagonal of the bridge 52. The opposite ends of the second bridge diagonal are coupled to the input of an emitter-follower amplifier 58 having its output terminals connected to the readout terminals 49 and 51. Bias terminals of the emitter-follower are connected to the positive and negative terminals of the voltage supply 55. Thus, inasmuch as an emitter-follower has a somewhat less than unity gain, output signals from the bridge 52 are somewhat reduced in being transmitted by the emitter-follower to the readout terminals. Thus, the positive readout terminal voltage cannot be employed in the manner described hereinbefore relative to the circuit of FIGURE 1, to effect switching of diodes to the end of providing an absolute calibration output signal. However, diodes may be employed in a similar arrangement as that of FIGURE 1, and switched in an analogous manner, by deriving a relatively high voltage from a point in the circuit other than the positive readout terminal. In the low output circuit of FIGURE 2, diodes 59 and 61 are provided with their positive terminals connected to the output terminals of the bridge 52 and their negative terminals connected to the input of the emitter-follower 58. In addition, diodes 62 and 63 are provided with their negative terminals connected to the negative terminals of diodes 59 and 61 and their positive terminals connected to the opposite ends of a calibrating resistance 64. A conductor 66 is connected to a tap 67 of the calibrating resistance 64, and this conductor is adapted for selective short-circuiting to the positive terminal 53 of power supply 55, which is the only point in the circuit having a higher voltage than that of the maximum possible output signal from the bridge 52. Short-circuiting of the conductor 66 to the terminal 53 is facilitated as by means of a switch 67 connected therebetween. Here again, the output signals from the bridge are sufficient to bias the diodes 59 and 61 in the forward directions to, in turn, bias diodes 62 and 63 in the reverse directions. Thus, under normal conditions the bridge output signals are applied to the emitter-follower 58 and, in turn, are transmitted to the readout terminals 49, 51 for registering by a suitable readout device connected thereto. When switch 67 is closed, or conductor 66 is otherwise short-circuited to the positive terminal 53 of the voltage supply, the relatively high positive voltage applied to the calibration resistance 64 serves to bias the diodes 62 and 63 in the forward directions and the diodes 59 and 61 to be biased in the reverse directions. The diodes 59 and 61 are thus cut off, and isolate the bridge output from the input of the emitter-follower 58. The portions of the calibrating resistance on opposite sides of the tap 67 are selected to provide an unbalanced voltage between the opposite ends thereof which is, in turn, transmitted by the emitter-follower 58 to the readout terminals 49 and 51 as an absolute calibration output signal. Additional taps may, of course, be provided on the calibrating resistance 64 and leads may be connected thereto for the selective short-circuiting of the taps to the positive terminal of the voltage supply 55, in a manner analogous to that described relative to FIGURE 1, to provide a plurality of shunt or calibration outputs of different values.

Figure 3:
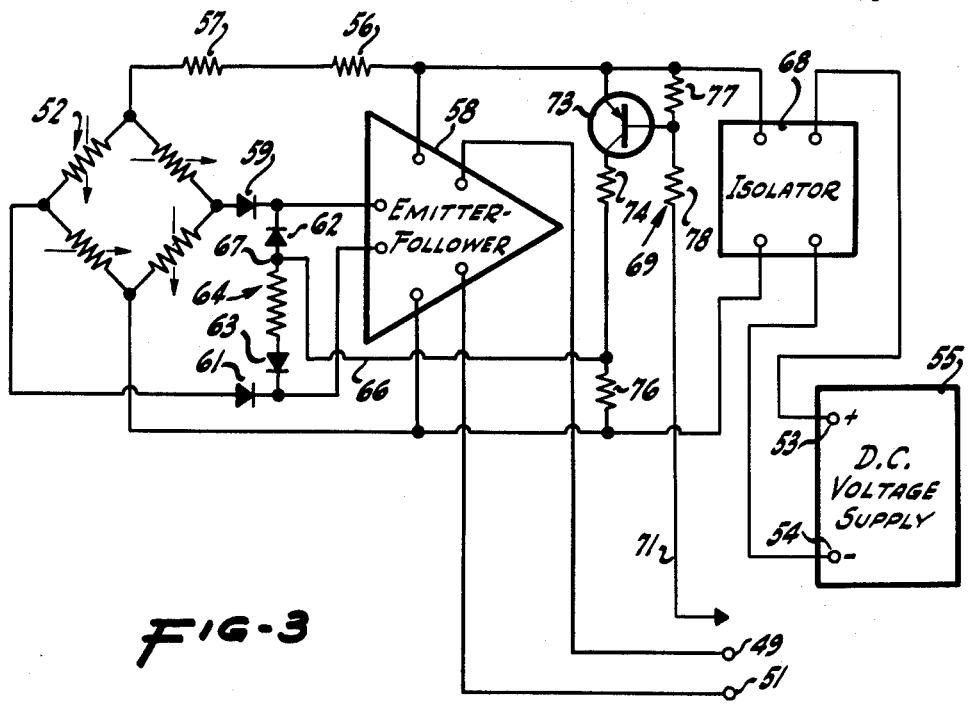
FIGURE 3 is a schematic circuit diagram of the absolute calibration output means of the present invention, as modified for incorporation in a low output, bridge-type transducer which include an isolator to isolate the direct current voltage supply from the excitation terminals of the bridge.

In some instances, a low output bridge transducer circuit, of the type depicted in FIGURE 2, is so arranged that the positive terminal of the voltage supply is not accessible for actuating the switching diodes of the absolute calibration output means. For example, as shown in FIGURE 3, an isolator 68 may be included in the circuit such that the positive terminal of the voltage supply is no longer accessible. Accordingly, an alternative arrangement must be provided to facilitate switching of the diodes 59 and 61 and 62 and 63. In this regard, an auxiliary switching circuit 69 may be provided which effects switching of the diodes of the calibration output means in response to short-circuiting of a conductor 71 to the relatively low voltage positive readout terminal 49. In its preferred form, the auxiliary switching circuit 69 includes a PNP transistor 73 which has its emitter connected to the positive excitation output of isolator 68 and its collector connected through a voltage divider, including resistors 74 and 76, to the negative excitation output of the isolator. The lead 66 from tap 67 of the calibrating resistance 64 is connected to the junction between the divider resistors 74 and 76. Transistor 73 is maintained in a normal "off" condition by means of a resistor 77 connected between the base of the transistor and the positive excitation output of the isolator 68. More particularly, the base of transistor 73, being thereby at a relatively high positive potential, causes negligible collector current to flow such that a negligible voltage drop exists across the divider resistors 74 and 76. Accordingly, the midpoint of these resistors is at a relatively low potential; and this low potential, as coupled by conductor 66 to the calibrating resistance 64, is insufficient relative to the output signals from the bridge 52 to bias the diodes 62 and 63 in the forward direction. Accordingly, at this time, the diodes 59 and 61 transmit the bridge output signals to the emitter-follower 58 which, in turn, transmits the signals to the readout terminals 49 and 51. However, the states of conduction of the diodes 59 and 61 and 62 and 63 are reversed when the transistor 73 is switched "on." This is herein facilitated by short-circuiting conductor 71 to the positive readout terminal 49, conductor 71 being connected by a resistor 78 to the base of transistor 73. Thus, when conductor 71 is short-circuited to the relatively low voltage of readout terminal 49, current flows through the resistors 77 and 78 to, in turn, reduce the base voltage of transistor 73. Substantial collector current accordingly now flows through the transistor 73, causing the midpoint of resistors 74 and 76 to assume a relatively high positive voltage. The ratio between the resistors 74 and 76 may be appropriately selected such that the voltage at their midpoint, as applied to the calibrating resistor 64, is sufficient to bias the diodes 62 and 63 in their forward directions and, in turn, apply reverse bias to the diodes 59 and 61. The voltage unbalance between the opposite ends of the calibrating resistor is again applied to the input of the emitter-follower 58, to the exclusion of bridge output signals, whereby an absolute calibration output is produced at the readout terminals 49 and 51.

Figure 4:
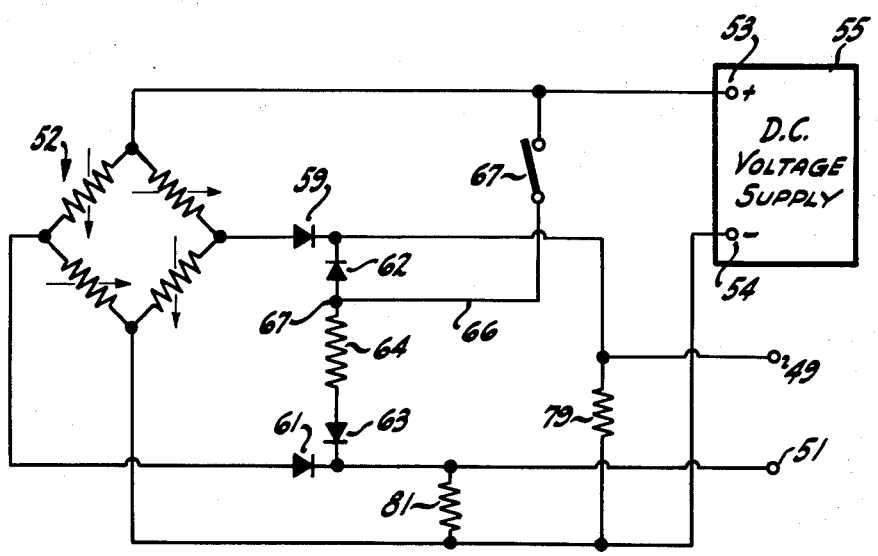
FIGURE 4 is a schematic circuit diagram of a modified form of absolute calibration output means, in accordance with the present invention, adapted for employment in a bridge-type transducer in which there is no provision for a low impedance output.

Although it is generally desirable that a transducer circuit include an emitter-follower in the output in order to provide a low output impedance, in some instances the follower may be omitted. Thus, the circuit of FIGURE 2 may, in some instances, not include the emitter-follower 58; and, in this regard, the calibration output means thereof requires some modification in the manner depicted in FIGURE 4. As shown therein, the junctures of the negative terminals of diodes 59 and 62 and 61 and 63 are directly connected to the readout terminals 49 and 51. Bleeder resistors 79 and 81 are then provided, respectively connected between the readout terminals 49 and 51 and the negative terminal 54 of the voltage supply 55 in order to provide a normal continuous forward current flow through the diodes 59 and 61. As in the instance of the circuit of FIGURE 2, switching of the diodes is facilitated by short-circuiting of the conductor 66 to the positive terminal 53 of the voltage supply.

Figure 5:
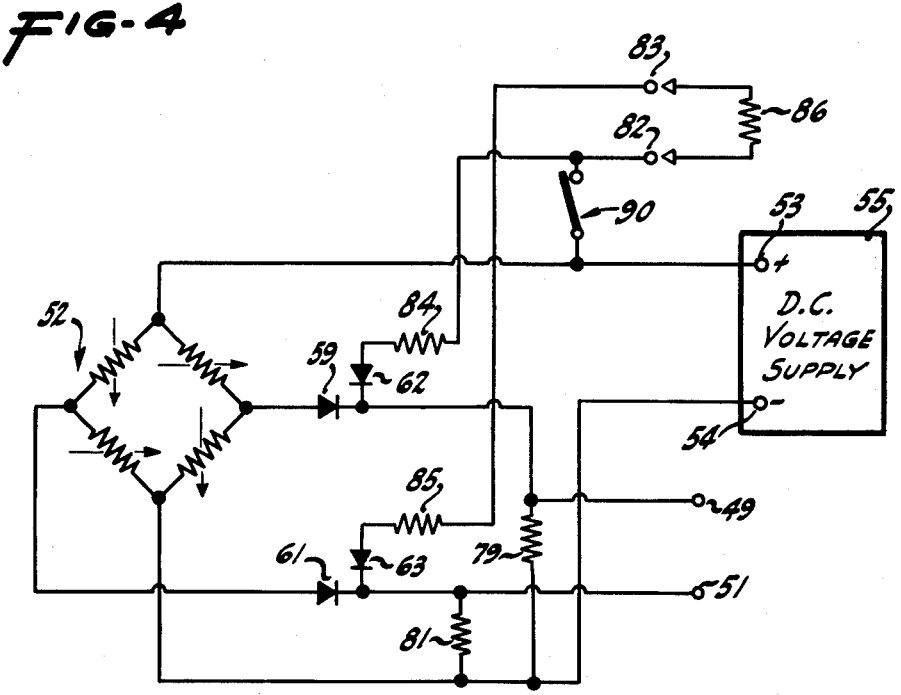
FIGURE 5 is a schematic circuit diagram similar to that of FIGURE 4, but wherein the absolute calibration output means is modified for use with calibrating resistors external to the transducer.

In all of the absolute calibration output circuit described to this point, the calibration resistance has been provided integrally with the transducer. In some instances, it is desirable that the calibration resistance be provided external to the transducer and that a number of calibration resistances of different predetermined values may be interchangeably employed with the circuit in order to provide a variety of absolute calibration outputs. To this end, the various circuits may be modified along the lines set forth hereinafter as described with particular reference to a modification of the circuit of FIGURE 4, which circuit modification is illustrated in FIGURE 5. As shown therein, a bridge circuit is provided which is generally similar to that of FIGURE 4, with the exception that the diodes 62 and 63, instead of being connected to the opposite ends of a calibration resistance, are coupled to a pair of calibration terminals 82 and 83 which are disposed external to the transducer and which are adapted for the connection of calibration resistances therebetween. In this regard, the positive terminals of the diodes 62 and 63 may be directly connected to the terminals 82 and 83; however, as depicted in the figure, the diodes may be alternatively coupled to the terminals through resistors 84 and 85 which serve to adjust the calibration outputs to values predetermined by the specification to which the transducer is being built. In other words, the resistors 84 and 85 function as voltage dividers to reduce the absolute calibration output voltage signals to values within a predetermined specified range. In other respects, upon the connection of a calibration resistance 86 between the terminals 82 and 83, the circuit of FIGURE 5 operates in a manner analogous to that of the circuit of FIGURE 4, selective switching of the circuit to provide an absolute calibration output being effected by short-circuiting one of the terminals 82 or 83 (comparable to lead 66) to the positive terminal 53 of the voltage supply 55, as by closing a short-circuiting switch 90 connected therebetween.

Figure 6:
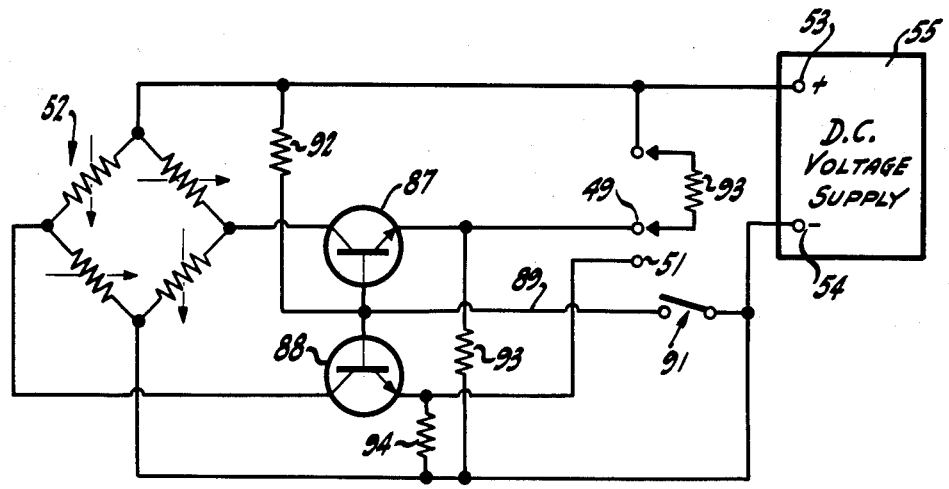
FIGURE 6 is a schematic circuit diagram of a transducer similar to that of FIGURE 5, but wherein a modified form of switching means is employed in the absolute calibration output means thereof.

Although two pairs of switching diodes have been employed as the first and second switching means in the absolute calibration output circuits described hereinbefore, a single pair of transistors may be alternatively employed in the accomplishment of the switching function. A pair of NPN-type transistors 87 and 88 may be provided in connection with the output terminals of the bridge 52 in the manner illustrated in FIGURE 6. More particularly, the transistors 87 and 88, respectively, have their collectors connected to the output terminals of the bridge and their emitters respectively connected to the readout terminals 49 and 51. The bases of transistors 87 and 88 are commonly connected to a short-circuiting lead 89, in turn connected through a switch 91 or the like, to the negative terminal 54 of voltage supply 55. The bases of the transistors are additionally commonly connected to one end of a dropping resistor 92 which has its other end connected to the positive terminal 53 of the supply 55. In addition, bleeder resistors 93 and 94 are provided, respectively connected between the readout terminals 49 and 51 and the negative terminal 54 of the voltage supply in a manner analogous to the connections of the bleeder resistors 79 and 81 employed in the circuits of FIGURES 4 and 5. With the short-circuiting switch 91 open, the bases of transistors 87 and 88 are positively polarized through the resistor 92 to thus provide a continuous forward current flow through the collector-emitter circuits of the transistors and the bleeder resistors 93 and 94. Accordingly, output signals from the bridge 52 are transmitted through the transistors 87 and 88 to the readout terminals 49 and 51. Now, to provide an absolute calibration output from the circuit, the switch 91 is closed to thereby short the bases of transistors 87 and 88 to the negative terminal 54 of the supply, thus terminating the flow of current between the emitter and collector of the respective transistors. The bridge output signals are thus isolated from the readout terminals 49 and 51, and upon the connection of a calibration resistance 93 between the positive supply terminal 53 and readout terminal 49 a current flows through the calibration resistance and the bleeder resistor 93 to thereby generate an absolute calibration output at the readout terminals.

Figure 7:
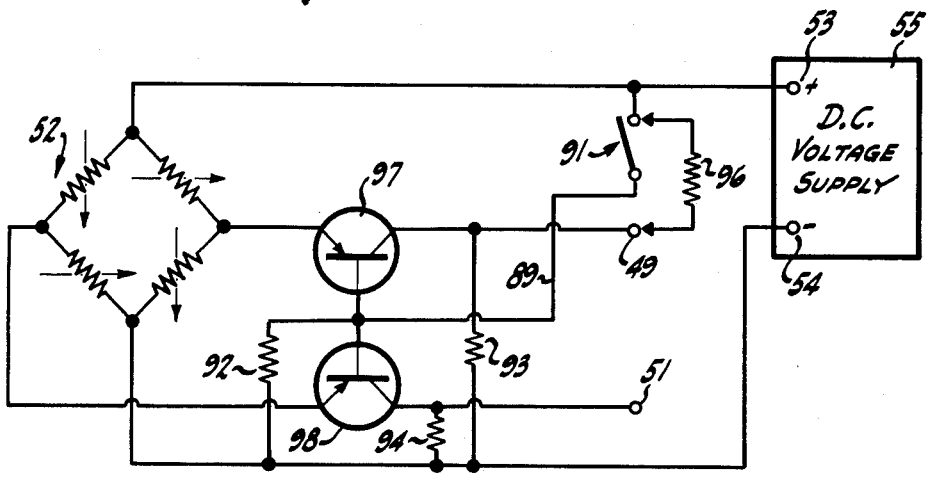
FIGURE 7 is a schematic circuit diagram illustrating a modification of the circuit of FIGURE 6.

PNP-type transistors may be alternatively employed to effect the switching and isolating actions in the provision of absolute calibration outputs according to the present invention, in the manner depicted in FIGURE 7. It is to be noted that this circuit is analogous to that of FIGURE 6, except that the transistor connections and biases are reversed. More particularly, a pair of PNP transistors 97 and 98 are provided with their emitters connected to the output terminals of the bridge 52 and their collectors connected to the readout terminals 49 and 51. In this case, however, the lead 89 from the commonly connected bases of the transistors is connected through the switch 91 to the positive supply terminal 53, rather than negative terminal 54. In addition, the resistor 92 in common connection with the bases of transistors 97 and 98, is connected to the negative supply terminal 54 rather than the positive terminal 53. The bleeder resistors 93 and 94 are still connected between the readout terminals 49 and 51 and the negative supply terminal 54. With the switch 91 open, the bases of transistors 97 and 98 are negatively polarized through resistor 92 to thus effect forward current flow in the emitter-collector circuits of the transistors and thus transmit output signals from the bridge 52 to the readout terminals. Upon closure of switch 91, the bases of the transistors are short-circuited to the positive supply terminal 53 to thereby terminate current flow between the emitters and collectors of the transistors and isolate the bridge output signals from the readout terminals. At this time, the calibration resistance 96 may be connected between the positive supply terminal 53 and the readout terminal 49 to thereby provide an absolute calibration output signal at the readout terminals.

Although the invention has been described hereinbefore with respect to a number of specific embodiments thereof, it will be appreciated that numerous variations and modifications may be made therein without departing from the spirit and scope of the invention; and thus, it is not intended to limit the invention except by the terms of the following claims.

What is claimed is:

1. Means for providing an absolute calibration output from a bridge-type transducer having direct current voltage excitation applied across one diagonal of the bridge and output terminals coupled to the opposite ends of the other diagonal of the bridge, comprising first and second electronic switch means respectively serially connected to said output terminals and normally conducting in response to voltage signals at said output terminals to transmit said signals therefrom while being nonconducting in response to voltages at the distal sides of the switch means relative to said output terminals of greater magnitude than the maximum voltage signals which can exist at said ouput terminals, a calibration resistance, third and fourth electronic switch means connecting said calibration resistance between said distal sides of said first and second electronic switch means, said third and fourth electronic switch means normally nonconducting in response to voltages at the respective junctures thereof with said first and second switch means having magnitudes in the range of said voltage signals at said output terminals, said third and fourth electronic switch means being rendered conducting in response to voltages at the opposite sides thereof from said junctions having magnitudes greater than said maximum voltage signal which can exist at said output terminals, and means coupled to said resistance for selectively applying voltage thereto commensurate with the establishment of voltages at the opposite sides of said third and fourth switch means from said junctures having magnitudes greater than said maximum voltage signals which can exist at said output terminals, whereby in the absence of voltage applied to said resistance the output signals of said transducer are provided at said junctions, and in the presence of voltage applied to said resistance an absolute calibration output is provided at said junctions.

2. Absolute calibration output means for a bridge transducer of the type having direct current voltage excitation applied across a first diagonal of the bridge and output signals provided across the second diagonal of the bridge and readout terminal means from which readout signals proportional to the bridge output signal may be derived, comprising switch means coupled between the second diagonal of said bridge and said readout means and having first and second states respectively wherein said output signals are transmitted to said readout terminal means and wherein said output signals are isolated therefrom, a calibrating resistance, second switch means coupling said resistance between the junctions of said first switch means with said readout terminal means, said second switch means having first and second states respectively wherein said calibrating resistance is decoupled from and coupled to said readout terminal means, and actuating means coupled to said first and second switch means for selectively and simultaneously switching same between said first and second states thereof, said actuating means including means applying voltage to said resistance having a greater magnitude than said output signals simultaneously with the switching of said first and second switch means from said first to said second states.

3. Absolute calibration output means for a bridge transducer of the type having direct current voltage excitation applied across a first diagonal of the bridge and output signals provided across output terminals coupled to the opposite ends of the second diagonal of the bridge and readout terminal means from which readout signals proportional to the bridge output signals may be derived, comprising first and second diodes connecting said output terminals to said readout terminal means with forwardly biased orientations relative to output signal voltages at said output terminals whereby said diodes are normally conducting and said output signals are transmitted to said readout terminal means, third and fourth diodes connected in opposition to said first and second diodes on the opposite sides thereof from said output terminals, a calibration resistance connected between said third and fourth diodes, and means for selectively applying a voltage to said resistance commensurate with the establishment of unbalanced voltages at said third and fourth diodes of magnitudes greater than the maximum voltage signal which can exist at said output terminals, whereby said first and second diodes may be rendered nonconducting and said third and fourth diodes rendered conducting to apply an absolute calibration signal proportional to said resistance to said readout terminal means.

4. Absolute calibration output means according to claim 3, further defined by said means for selectively applying a voltage to said resistance comprising means for selectively short-circuiting said resistance to said direct current voltage excitation.

5. Absolute calibration output means according to claim 3, but wherein said readout terminal means includes amplification means with an overall gain greater than unity having its output coupled to readout terminals, and said means for selectively applying a voltage to said resistance comprises means for selectively short-circuiting said resistance to the output of said amplification means.

6. In a transducer which includes a bridge with excitation terminals at opposite ends of one bridge diagonal and respectively coupled to positive and negative terminals of a direct current voltage supply and readout terminals for coupling to the opposite ends of the second bridge diagonal, the combination of absolute calibration output means comprising a pair of transistors respectively having first terminals connected to the opposite ends of said second bridge diagonal, second terminals connected to said readout terminals, and third terminals biased with a polarity relative to said first terminals to establish current flow from said first to said second terminals of said transistors, a calibration resistance, and means for selectively reversing the polarity of the bias of said third terminals and connecting said resistance between a terminal of said voltage supply and one of said readout terminals.

7. In a transducer which includes a bridge with excitation terminals connected to opposite ends of one bridge diagonal and respectively coupled to positive and negative terminals of a direct current voltage supply and readout terminals for connection to the opposite ends of the second bridge diagonal, absolute calibration output means comprising a pair of transistors each having first, second and third terminals, said first terminals respectively connected to the opposite ends of said second bridge diagonal, said second terminals respectively connected to said readout terminals, said third terminals commonly connected, bleeder resistors connecting said second terminals to the negative terminal of said voltage supply, a bias resistor connecting said third terminals to one terminal of said voltage supply of a polarity to establish current flow from said first to said second terminals, means for selectively short-circuiting said third terminals to the opposite polarity terminal of said voltage supply, and a calibration resistance selectively connectable between the positive terminal of said voltage supply and one of said readout terminals.

8. In a transducer which includes a bridge with excitation terminals connected to opposite ends of one bridge diagonal and respectively coupled to positive and negative terminals of a direct current voltage supply and readout terminals for connection to the opposite ends of the second bridge diagonal, absolute calibration output means comprising a pair of NPN transistors each having a base, collector and emitter, said bases of said transistors commonly connected, said collectors of said transistors respectively connected to the opposite ends of the second bridge diagonal, said emitters of said transistors respectively connected to said readout terminals, a pair of bleeder resistors respectively connecting the emitters of said transistors to the negative terminal of said voltage supply, a bias resistor connecting the common connection of the bases of said transistors of the positive terminal of said voltage supply, means for selectively connecting the common connection of the bases of said transistors to the negative terminal of said voltage supply, and a calibration resistance selectively connectable between the positive terminal of said voltage supply and one of said readout terminals.

9. In a transducer which includes a bridge with excitation terminals connected to opposite ends of one bridge diagonal and respectively coupled to positive and negative terminals of a direct current voltage supply and readout terminals for connection to the opposite ends of the second bridge diagonal, absolute calibration output means comprising a pair of PNP transistors each having a base, collector and emitter, said bases of said transistors commonly connected, said emitters of said transistors respectively connected to the opposite ends of said second bridge diagonal, said collectors of said transistors respectively connected to said readout terminals, a pair of bleeder resistors respectively connecting said collectors of said transistors to the negative terminals of said voltage supply, a bias resistor connecting the common connection of said bases of said transistors to the negative terminal of said voltage supply, means for selectively connecting the common connection of the bases of said transistors to the positive terminal of said voltage supply, and a calibration resistance selectively connectable between the positive terminal of said voltage supply and one of said readout terminals.

10. A bridge circuit with absolute calibration output comprising a four-arm bridge of transducer elements, a direct current voltage supply, a direct current isolator coupled to said supply and having a pair of excitation terminals connected to opposite ends of one diagonal of said bridge, first and second diodes having their positive terminals connected to the opposite ends of the second diagonal of said bridge, third and fourth diodes having their negative terminals respectively connected to the negative terminals of said first and second diodes, a calibration resistance connected between the positive terminals of said third and fourth diodes, a pair of readout terminals, means coupling said readout terminals to the junctions of the negative terminals of said first and third and said second and fourth diodes, a voltage divider, electronic switch means coupling said divider between the excitation terminals of said isolator, said switch means having a normal "off" state and a triggered "on" state, said switch means having an input terminal for triggering the switch means to said "on" state in response to the application of voltage thereto with a magnitude substantially equal that at a predetermined one of said readout terminals, means connecting a tap of said divider to said resistance, and means for selectively connecting the input terminal of said switch means to said predetermined one of said output terminals to thereby selectively produce voltages at the positive terminals of said third and fourth diodes conducive to the conduction thereof.

11. A bridge circuit with absolute calibration output comprising a four-arm bridge of transducer elements, a direct current voltage supply, a direct current isolator coupled to said supply and having a pair of excitation terminals connected to opposite ends of one diagonal of said bridge, first and second diodes having their positive terminals connected to the opposite ends of the second diagonal of said bridge, third and fourth diodes having their negative terminals respectively connected to the negative terminals of said first and second diodes, a calibration resistance connected between the positive terminals of said third and fourth diodes, a pair of readout terminals, means coupling said readout terminals to the junctions of the negative terminals of said first and third and said second and fourth diodes, a voltage divider connected at a first end to the negative one of said pair of excitation terminals, said divider having an intermediate tap connected to said calibration resistance, a switching transistor having a base, emitter and collector, said collector connected to the second end of said divider, said emitter connected to the positive one of said pair of excitation terminals, a bias resistor connecting the base of said transistor to said positive one of said excitation terminals to prevent the flow of collector current in said transistor, a second bias resistor connected to the base of said transistor, and means for selectively connecting said second bias resistor to the positive one of said readout terminals to thereby reduce the voltage at the base of said transitor and effect the flow of current in the collector thereof, whereby the voltage at the tap of said divider is increased to establish unbalanced voltages at the positive terminals of said third and fourth diodes conducive to the conduction thereof.

12. A bridge circuit with absolute calibration output comprising a four-arm bridge of transducer elements, a direct current voltage supply having positive and negative terminals respectively coupled to opposite ends of one diagonal of said bridge, first and second diodes having their positive terminals connected to the opposite ends of the second diagonal of said bridge, third and fourth diodes having their negative terminals respectively connected to the negative terminals of said first and second diodes, a calibration resistance connected between the positive terminals of said third and fourth diodes, said calibration resistance having a plurality of taps, a pair of readout terminals, means coupling said readout terminals to the junctions of the negative terminals of said first and third and said second and fourth diodes, and means for selectively connecting said taps to a source of voltage having a magnitude substantially greater than that which can exist at the opposite ends of said second diagonal of said bridge.

13. A bridge circuit with absolute calibration output according to claim 12, further defined by said means coupling the negative terminals of said first and third and said second and fourth diodes to said readout terminals including a difference amplifier having a greater-than-unity gain, and said means for selectively connecting the taps of said calibration resistance to a source of voltage comprising means for selectively connecting said taps to the positive one of said readout terminals.

14. A bridge circuit with absolute calibration output according to claim 12, further defined by said means for selectively connecting said taps of said calibration resistance to a source of voltage comprising means for selectively connecting said taps to the positive one of said terminals of said direct current voltage supply.

15. A bridge circuit with absolute calibration output comprising a four-arm bridge of transducer elements, a direct current voltage supply, means coupling said voltage supply to the opposite ends of one diagonal of said bridge, an emitter-follower amplifier having its input coupled to the opposite ends of the second diagonal of said bridge, first and second diodes having their positive terminals connected to the output of said emitter-follower, third and fourth diodes having their negative terminals respectively connected to the negative terminals of said first and second diodes, a calibration resistance connected between the positive terminals of said third and fourth diodes, said calibration resistance having at least one tap, a difference amplifier having a gain substantially greater than unity, said difference amplifier having an input connected to the negative terminals of said first and third and said second and fourth diodes, a second emitter-follower having its input connected to the output of said difference amplifier, positive and negative readout terminals connected to the output of said second emitter-follower, and means for selectively connecting said taps of said calibration resistance to said positive readout terminal.

16. A bridge circuit with absolute calibration output comprising a four-arm bridge of transducer elements, a direct current voltage supply having positive and negative terminals respectively connected to the opposite ends of one diagonal of said bridge, first and second diodes having their positive terminals connected to the opposite ends of the second diagonal of said bridge, third and fourth diodes having their negative terminals respectively connected to the negative terminals of said first and second diodes, a calibration resistance connected between the positive terminals of said third and fourth diodes, an emitter-follower amplifier having its input connected to the junctions of the negative terminals of said first and third and said second and fourth diodes, readout terminals connected to the output of said emitter-follower amplifier, and a conductor connected to the tap of said calibration resistance and selectively connectable to said positive terminal of said voltage supply.

17. A bridge circuit with absolute calibration output comprising a four-arm bridge of transducer elements, a direct current voltage supply having positive and negative terminals respectively connected to opposite ends of one diagonal of said bridge, first and second diodes having their positive terminals respectively connected to opposite ends of said second diagonal of said bridge, third and fourth diodes having their negative terminals respectively connected to the negative terminals of said first and second diodes, readout terminals respectively connected to the negative terminals of said first and third and said second and fourth diodes, a pair of bleeder resistors respectively connecting the negative terminals of said first and third and said second and fourth diodes to said negative terminal of said voltage supply, a calibration resistance connected between the positive terminals of said third and fourth diodes, and a conductor connected to said calibration resistance and selectively connectable to said positive terminals of said voltage supply.

18. A bridge circuit with absolute calibration output comprising a four-arm bridge of transducer elements, a direct current voltage supply having positive and negative terminals respectively connected to opposite ends of one diagonal of said bridge, first and second diodes having their positive terminals connected to the opposite ends of the second diagonal of said bridge, third and fourth diodes having their negative terminals respectively connected to the negative terminals of said first and second diodes, a pair of dropping resistors respectively connected to the positive terminals of said third and fourth diodes, a pair of calibration terminals respectively connected to said pair of dropping resistors, a pair of readout terminals respectively connected to the negative terminals of said first and third and said second and fourth diodes, a pair of bleeder resistors respectively connecting said readout terminals to said negative terminal of said voltage supply, a calibration resistance selectively connectable between said pair of calibration terminals and means for selectively connecting one of said calibration terminals to said positive terminal of said voltage supply.

References Cited by the Examiner

UNITED STATES PATENTS

| | | | |
|---|---|---|---|
| 2,504,965 | 4/50 | Davis | 324—62 X |
| 3,060,379 | 10/62 | Osvold | 324—62 |

LOUIS R. PRINCE, *Primary Examiner.*